(12) United States Patent
Kroeker

(10) Patent No.: US 6,557,802 B2
(45) Date of Patent: May 6, 2003

(54) DEVICE FOR SEPARATION OF A PLURALITY OF AXIALLY ARRANGED SATELLITES

(75) Inventor: Juergen Kroeker, Markdorf (DE)

(73) Assignee: Astrium GmbH, Friedrichshafen (DE)

( * ) Notice: Subject to any disclaimer, the term of this patent is extended or adjusted under 35 U.S.C. 154(b) by 0 days.

(21) Appl. No.: 10/012,566

(22) Filed: Dec. 12, 2001

(65) Prior Publication Data

US 2002/0079406 A1 Jun. 27, 2002

(30) Foreign Application Priority Data

Dec. 12, 2000 (DE) .......................... 100 61 773

(51) Int. Cl.$^7$ ................................ B64G 1/64
(52) U.S. Cl. ..................................... 244/161
(58) Field of Search .................. 244/161, 158 R, 244/137.1, 137.4; 89/1.806, 1.819, 1.59; 248/371, 372.1; 74/469, 490.01, 490.03, 414

(56) References Cited

U.S. PATENT DOCUMENTS

| | | | | |
|---|---|---|---|---|
| 3,341,151 A | * | 9/1967 | Kampinsky | |
| 4,043,524 A | * | 8/1977 | Dreyer et al. | |
| 4,116,413 A | * | 9/1978 | Andersen | |
| 4,483,505 A | * | 11/1984 | Dalbo | |
| 4,529,154 A | * | 7/1985 | Rinn et al. | |
| 4,753,408 A | * | 6/1988 | Wailes | |
| 5,411,226 A | * | 5/1995 | Jones et al. | |
| 5,860,624 A | * | 1/1999 | Obry et al. | |
| 6,135,391 A | * | 10/2000 | Van Woerkom | |
| 6,138,951 A | * | 10/2000 | Budris et al. | |
| 6,354,540 B1 | * | 3/2002 | Lewis et al. | |

* cited by examiner

Primary Examiner—Tien Dinh
(74) Attorney, Agent, or Firm—Crowell & Moring LLP

(57) ABSTRACT

A separation frame for mounting and separating satellites in a launch vehicle, includes two congruent frames (10, 12) are arranged one inside the other. The frames are connected to each other by means of a swivel joint.

7 Claims, 3 Drawing Sheets

DEVICE FOR SEPARATION OF A PLURALITY OF AXIALLY ARRANGED SATELLITES

BACKGROUND AND SUMMARY OF THE INVENTION

This application claims the priority of German patent document 100 61 773.5, filed Dec. 12, 2000, the disclosure of which is expressly incorporated by reference herein.

Satellite constellations are continuously gaining in importance in all kinds of applications, such as in communication, navigation and science. To minimize launching costs, increasingly multiple launches are being conducted. Currently, multiple launches in separate structures are customary (Globalstar), such as with ARIANE/SOYUZ or with two and more satellites arranged laterally around an adapter. This arrangement permits for a lateral separation of the satellites. Newer satellites, such as Teledesic and TerraStar, require a parallel, axial arrangement of several satellites on an adapter, due to their geometric specifications (e.g. antenna size).

There are several alternatives for separating axially arranged satellites:

1. Simultaneous separation of the satellites from the adapter. Two problems arise with this approach: the separation must actually take place simultaneously, and the masses of the satellites must be identical. Even if there is only a slight inclination of the direction of separation (toward the outside), the satellites will remain very close together, resulting in a collision danger.
2. Staggered separation of the satellites from the adapter. With this possibility, a resulting moment is created on the remaining body (adapter, upper stage and remaining satellite(s)), because the line of application of the separation forces does not pass through the center of gravity of the remaining body. The resulting moment causes a rotation on the remaining body which can lead to a collision with the separating satellite.

Mounting one or more satellites on the rocket adapter by means of two clamping rings per satellite is disclosed in U.S. Pat. No. 5,860,624. The clamping rings, which are arranged one above the other, are connected with each other by means of a joint. By means of spring force and the joint, the satellite that is to be launched is brought into a pivoted position and is then launched. The two clamping rings must be dimensioned accordingly to be able to accommodate and transfer the total forces during the launch phase.

One object of the present invention to provide a separation frame that will securely accommodate the forces during the launch phase and that will allow for a trouble-free separation of the satellites while having a low dead weight frame.

This and other objects and advantages are achieved by the separation frame according to the invention, in which two similarly shaped frames are arranged one inside the other, and are connected via a joint. The inner frame can be swiveled around an axis of rotation such that the final direction or axis of separation runs through the center of gravity of the remaining body.

Other objects, advantages and novel features of the present invention will become apparent from the following detailed description of the invention when considered in conjunction with the accompanying drawings.

DETAILED DESCRIPTION OF THE DRAWINGS

Figure 1:
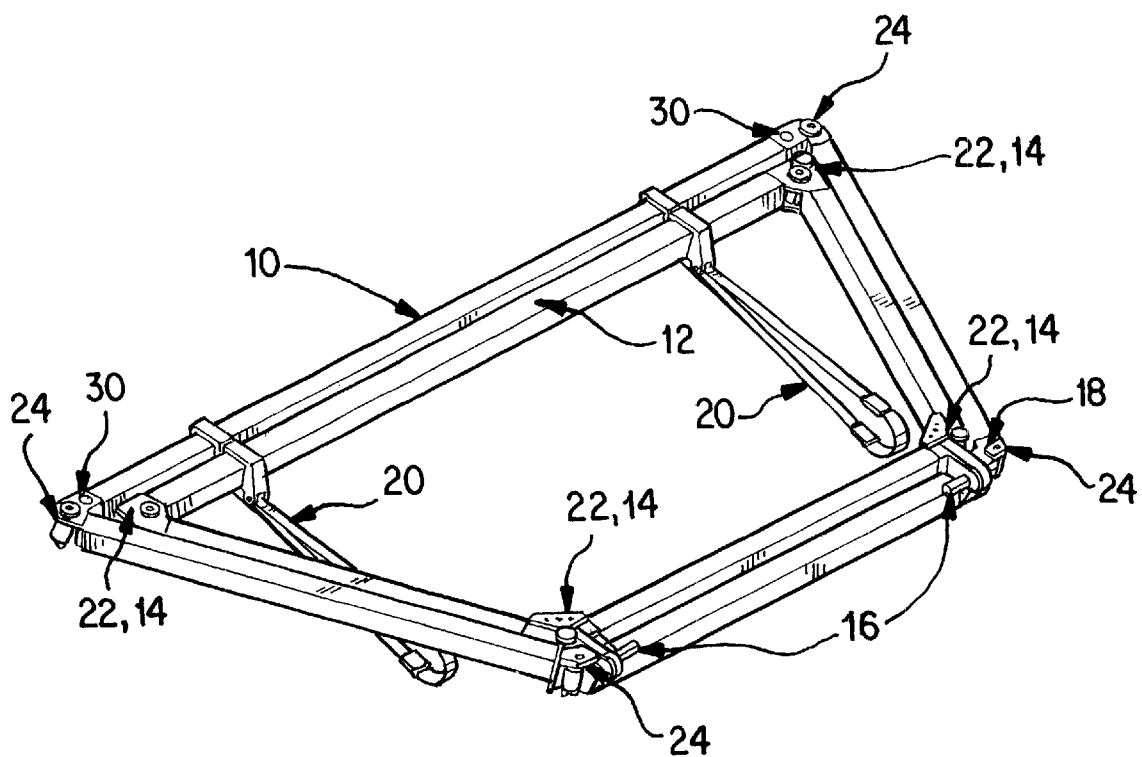
FIG. 1 is a perspective view of a separation frame according to an embodiment of the invention.
Figure 2:
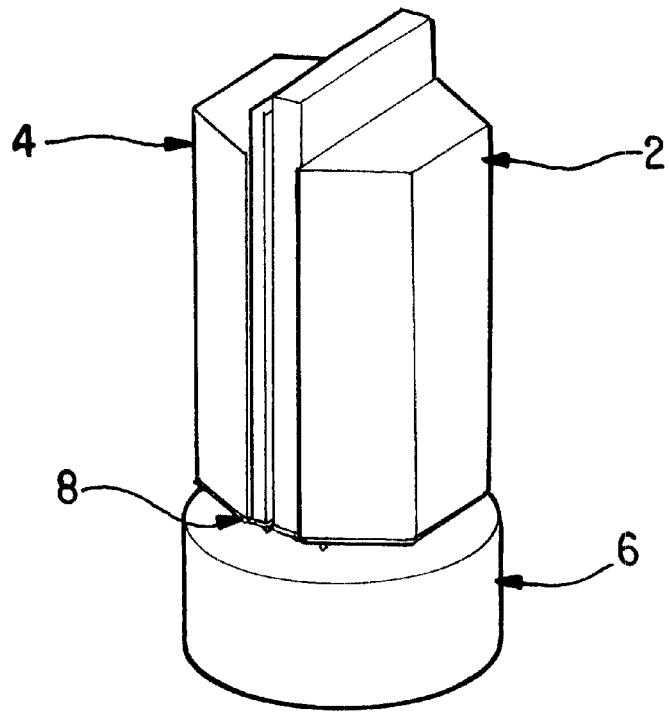
FIG. 2 shows two satellites on a rocket adapter.
Figure 4:
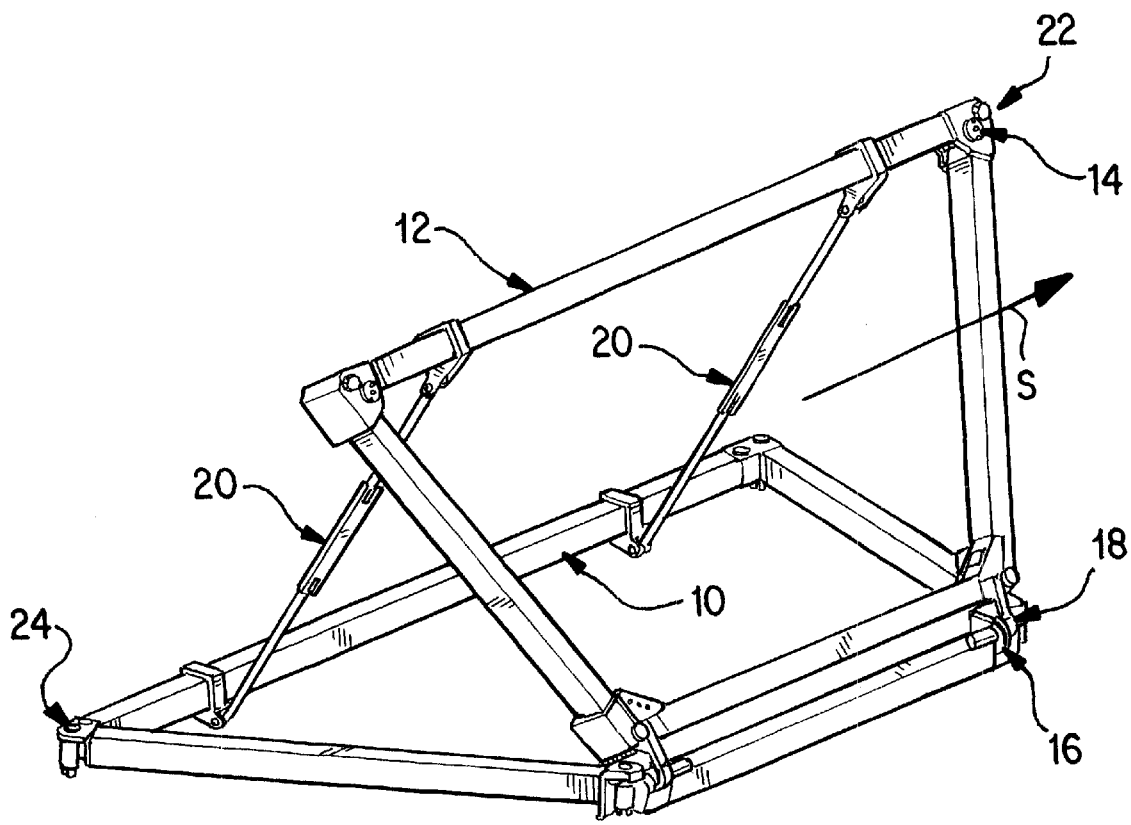
FIG. 4 is an enlarged representation of the details in FIG. 3.

As illustrated in FIG. 2, a separation frame assembly 8 is located between two satellites 2, 4, on a rocket adapter 6. As best seen in FIGS. 1 and 4, the separation frame assembly 8 consists of the following structural elements:

Outer Frame 10 and Inner Frame 12
    Separation springs 14 (between inner frame and satellites)
    Drive 16 (for example, pre-stressed spring, electric motor, paraffin motor) of the inner frame
    Joint 18 (can also be integrated in the drive)
    Lock 20
    Additional separation bolts 22 between inner frame 12 and satellites 2, 4.

The separation frame assembly 8 consists two frames 10, 12 that are movable in relation to each other. The larger outer frame 10 is connected to the launcher interface, while the smaller inner frame 12 is articulated on the larger frame 10 and rotates the satellite into a desired separation position where the frame is held by a locking device.

The complete frame assembly 8, consisting of inner frame 12 and outer frame 10, can be pre-assembled, and is attached to the satellites 2, 4 using a central or several separation bolts 22.

Figure 3:
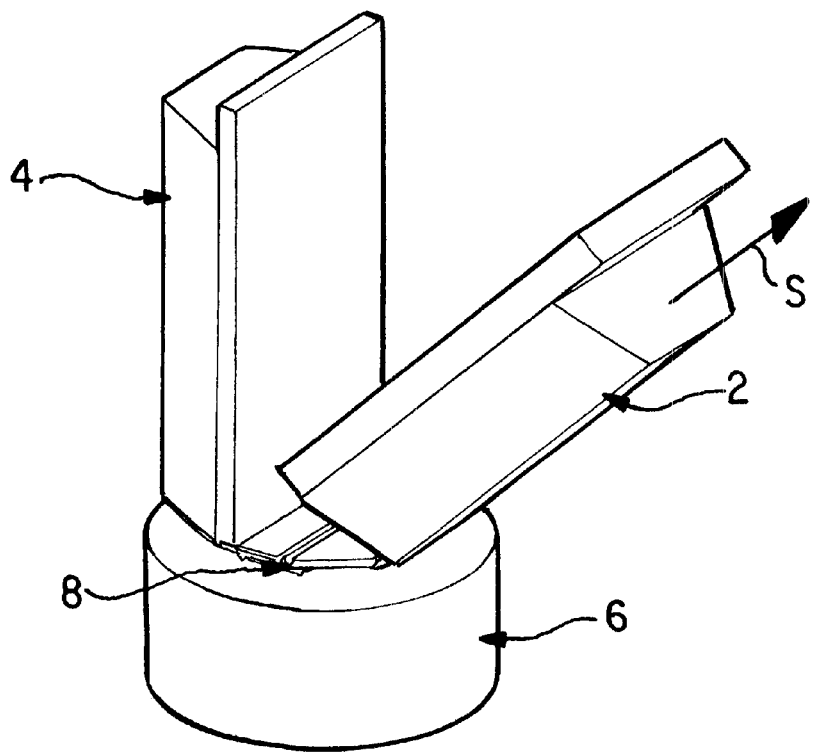
FIG. 3 shows the alignment of a satellite in the direction of separation.

Satellite and frame 8 are mounted on the rocket adapter 6, using the satellite separation bolts 24, as best seen in FIGS. 2 and 3.

Joint 18, drive 16 and lock 20 are installed on the rocket adapter 6.

During the launch phase, the launching forces of the satellite are directed through the outer separation frame 10 directly into the rocket adapter 6 by way of the satellite separation bolts 24. During this phase, the inner separation frame 12 is between rocket adapter 6 and satellite 2, 4 and without function.

The separation of satellite 2 takes place in several stages:

1. The satellite separation bolts 24 between rocket adapter 6 and satellite 2 are ignited. This will release the connection of the satellite 2 and separation frame 10 to the rocket adapter 6. The inner separation frame 12 is still fastened to the satellite 2 with the additional separation bolts 22 and connected to the rocket adapter 6 by way of the joint 18.
2. The inner separation frame 12 rotates around its rotational axis and is locked in its final position. With a pre-stressed spring 16, the rotation can be automatic. If an electric motor or a paraffin motor is used, it must be triggered separately. The rotational axis and the mounting angle are selected to ensure that the center of gravity of satellite 2 and of the remaining body 4, 6 lie on the line of the direction of separation (also referred to as a "separation axis", indicated by arrow S in FIGS. 3 and 4). The locking action can be effected by means of a mechanism or a "C-spring" 20.
3. The separation bolt or bolts 22 between the inner separation frame 12 and the satellite 2 are ignited, and the satellite is separated by force by the pre-stressed separation springs 14.

Both frames 10, 12 are connected to one satellite 2, 4, respectively, via a separation mechanism. The two frames are connected to each other by way of two single-axis hinge joints 18. After the inner frame 12 has been unfolded, the end position is secured with a locking mechanism 20.

Four large separation bolts 24 are placed in the four corner points in the outer frame 10, which transfer the launch loads of the satellite to the launcher interface.

Kick springs 30 are located in the outer frame 10, opposite the joints, that provide the satellite 2 with an impulse following the activation of the large separation bolts 24 and, consequently, support the rotation right from the beginning. The joints 18 and torsion springs 16 for the rotation of the inner frame are fastened on the front corner profiles of the outer frame.

The satellite is fastened to the inner frame 12, which is able to rotate, with separation bolts 22. The separation springs 14 are also found in the corner profiles with the separation bolts 22; they set the satellite 2 in motion at a defined speed away from the frame, following the separation of the small separation bolts 22.

One separation frame is necessary per satellite.

In summary, the operation sequence of the separation frame according to the invention is as follows:

Separation of the outer frame from the launcher by activation of the separation bolts.

Start of the unfolding of the inner frame by way of kick springs and torsion springs.

Securing the final position with the locking mechanism.

Separation of the satellite from the inner frame by activation of the separation bolts.

Separation springs move the satellite away from the inner frame.

The separation frame assembly, and its manner of operation, achieve the following advantages:

Neither the separating satellite 2 nor the bodies 4, 6 remaining behind undergo a rotation during the separation.

Therefore, the alignment of the apparatus in relation to the Sun and the Earth that is selected remains intact for all satellites.

Minimal expense and effort are required to stabilize the satellites.

There is no collision danger.

The separation of several satellites can be staggered in terms of time, simplifying control of each satellite from the ground.

The separation frame does not change natural frequencies and launch loads.

As many satellites as desired can be separated one after the other.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A frame assembly for separably mounting satellites in a launch vehicle, said frame assembly comprising:

first and second correspondingly shaped frames arranged one inside the other;

a joint rotatably connecting said first and second frames;

first releasable connectors for detachably mounting said satellite to said launch vehicle via said first frame; and second releasable connectors for detachably mounting said satellite to said second frame.

2. The frame assembly according to claim 1, wherein:

said first frame is an outer frame;

said second frame is an inner frame; and the inner frame is rotatable relative to the outer frame about an axis of rotation through the joint, such that a separation axis of a satellite attached to said second frame runs through a center of gravity of the satellite and of a remaining body of said launch vehicle.

3. The frame assembly according to claim 1, wherein the outer frame and the inner frame, respectively, have the form of satellite interfaces.

4. Apparatus for separably mounting a satellite to a launch vehicle, comprising:

a first frame having releasable connectors for detachably mounting said satellite to said launch vehicle via said first frame;

a second frame having releasable connectors for detachably mounting the satellite to the second frame, said second frame being coupled to said first frame via a rotation joint; wherein said second frame has a shape that corresponds to a shape of first frame;

said second frame is rotatable about said joint between a first position in which said second frame is substantially coplanar with and nested within said first frame, and a second position in which a plane of said second frame is inclined at a preselected angle relative to a plane of said first frame.

5. The apparatus according to claim 4, further comprising:

a driver for causing said second frame to rotate from said first position to said second position; and locking apparatus for fixing said second frame in said second position; wherein said preselected angle is such that a separation axis of a satellite detachably connected to said second frame passes through a center of gravity of the satellite and of a remaining mass of said launch-vehicle.

6. A method of separating a satellite from a launch vehicle, comprising:

detachably mounting a first frame to said launch vehicle via releasable connectors that detachably mount said satellite to said launch vehicle via said first frame;

detachably mounting said satellite to a second frame which has a shape corresponding to a shape of said first frame, is connected to said first frame via a rotation joint, and is rotatable about said joint between a first position in which said second frame is substantially coplanar with said first frame and nested inside said first frame, and a second position in which a plane of said second frame is inclined at a preselected angle relative to a plane of said outer frame;

deploying said second frame initially in said first position, whereby a satellite detachably mounted thereto is detachably connected to said launch vehicle via said first frame during a launch of said satellite; and following a release of said releasable connectors, rotating said second frame from said first position to said second position; and detaching said satellite from said second frame.

7. The method according to claim 6, wherein said preselected angle is such that a separation axis of said satellite passes through a center of gravity of the satellite and of a remaining mass of said launch-vehicle.

* * * * *